United States Patent Office 3,097,203
Patented July 9, 1963

3,097,203
TRIS-PYRIDYL HYDRAZONE DERIVATIVES
OF TRIAMINO-GUANIDINE
Siegfried Petersen, Leverkusen, Konrad Swincicki, Cologne-Stammheim, and Wolfgang Wirth, Wuppertal-Elberfeld, Germany, assignors to Farbenfabriken Bayer Aktiengesellschaft, Leverkusen, Germany, a corporation of Germany
No Drawing. Filed Mar. 22, 1961, Ser. No. 97,432
Claims priority, application Germany Mar. 25, 1960
4 Claims. (Cl. 260—240)

This invention relates to the production of novel hydrazones. More particularly, the present invention relates to the reaction of triamino guanidine with pyridine aldehydes to produce pharmaceutically valuable hydrazones.

It has been known heretofore to produce hydrazones from the reaction of triaminoguanidine salts with aromatic or aliphatic aldehydes such as acrolein, 4-chlorobenzaldehyde or 2-nitrobenzaldehyde in dilute ethanol. Triaminoguanyl hydrazones thus prepared, however, suffer from a number of disadvantages and particularly from the fact that they are relatively difficultly soluble in aqueous media even in the form of their salts.

It has now been found that by reacting triaminoguanidine with pyridine aldehydes, novel and readily soluble tris-pyridylhydrazones are produced, which are possessed of valuable hypotensive activity coupled with good compatibility.

The novel tris-pyridylhydrazones of the invention may be defined by the following general formula:

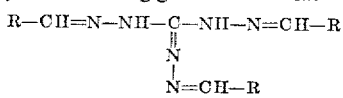

wherein R is a pyridyl radical or a substituted pyridyl radical. Where substituted, the pyridyl radical contains normally halogen, alkyl or alkoxy groups, the latter two groups usually containing, when present, from 1 to 7 carbon atoms. Further, in such instances of substitution in the pyridyl ring, the substitution occurs on 1 to 2 carbon atoms of the ring structure.

Suitable pyridine aldehyde reactants for use in the practice of the invention are the 2, 3, and 4-pyridine aldehydes which may be substituted, customarily, by from 1 to 2 substituents attached to the carbon atoms of the ring component; e.g. such groups as halogen, alkyl, and alkoxy moieties, the latter two components usually containing from 1 to 7 carbon atoms. Mixtures of these pyridine aldehydes may also be employed as reactants.

The triaminoguanidine reactant is preferably employed in the reaction of the present invention in the form, for example, of its acid-addition salts. The condensation may thus, by way of illustration, be carried out by simultaneously introducing a solution of triaminoguanidine hydrochloride in concentrated hydrochloric acid into a dilute alcoholic, e.g. ethanol or methanol, solution of the pyridine aldehyde.

The reactions of the invention are carried out at a temperature within the range of 10° C. to 100° C. and preferably at 30° C. to 40° C. When working in acid solution, the product hydrazones separate in the form of their salts. The corresponding bases may be recovered by careful neutralization with, for example, ammonia or sodium carbonate. Stoichiometric amounts of the reactants, triaminoguanidine and pyridine aldehyde, are preferably employed. Thus by way of illustration, where 1 mol of triaminoguanidine is reacted with 3 moles of pyridine aldehyde, the analytically pure tris-hydrazone of the invention will be produced. If less than the stoichiometric amount of pyridine aldehyde is utilized, product mixtures are obtained which contain free hydrazine groups. If an individual pyridine aldehyde, or a mixture of pyridine aldehydes, as described hereinabove, contains, in addition, other aldehyde components, which would constitute, in effect, impurities in the reaction mixture, this is not critical, since the desired hydrazone products of the invention are readily separated out.

The tris-pyridylhydrazones thus prepared are yellow compounds which crystallize in the pure state. Their mineral acid salts are water-soluble and therefore well adapted for pharmaceutical use.

The following examples are further illustrative of the invention.

EXAMPLE 1

Preparation of the Compound, Tris-(Pyridyl-4-Hydrazone)

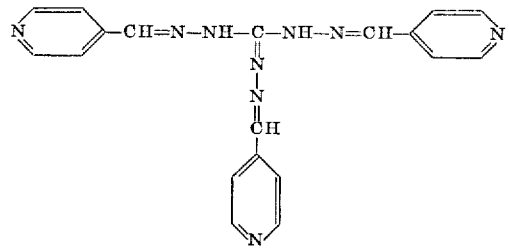

Thirty-three (33) grams of pyridine-4-aldehyde are dissolved in 300 ml. of methanol and heated to 35° C. A solution of 14 grams of triaminoguanidine hydrochloride in 80 ml. of water and 10 ml. of concentrated hydrochloric acid together with an additional 20 ml. of concentrated hydrochloric acid are dropped with stirring inside 30 minutes into the methanol solution. The temperature is kept within the range of 35° C. to 40° C. After two hours the mixture is cooled to 10° C. and the yellow reaction product filtered by suction. For purification the crude product is dissolved in a little water and double the amount of ethanol is added to the solution. Yellow crystals are obtained having a point of decomposition at 318° C.–322° C. By carefully neutralizing with ammonia the free base is obtained which has a melting point of 222° C.–224° C.

The intravenous application of 5 mg. of the corresponding hydrochloride in aqueous solution to a cat shows a hypotensive effect lasting for 30 to 40 minutes.

EXAMPLE 2

Preparation of the Compound, Tris-(Pyridine-3-Hydrazone)

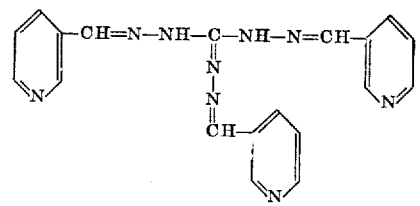

Thirty-three (33) grams of pyridine-3-aldehyde are dissolved in 400 ml. of ethanol and heated to 35° C.–40° C. A solution of 14 grams of triaminoguanidine hydrochloride in 80 ml. of water and 10 ml. of concentrated hydrochloric acid are dropped, together with an additional 20 ml. of concentrated hydrochloric acid, into this solution by stirring within a period of 30 minutes. The temperature is kept within the range of 35° C.–40° C. After a further two hours the mixture is cooled to 10° C. and a yellow reaction product filtered by suction. For purification, the crude product is dissolved in a little water, whereupon 8 ml. of concentrated hydrochloric acid and about double the amount of ethanol are added. The crystalline yellow product is filtered by suction and dried in the air. The reaction product melts at 285° C.

The compound has a long lasting vasodepressive activity similar to that of Example 1, when administered to a cat intravenously.

EXAMPLE 3

*Preparation of the Compound, Tris-(Pyridyl-2-Hydrazone)*

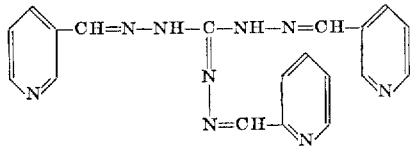

Thirty-three (33) grams of pyridine-2-aldehyde are dissolved in 300 ml. of methanol and heated to 35° C. A solution of 14 grams of triaminoguanidine hydrochloride in 80 ml. of water and 10 ml. of concentrated hydrochloric acid and a further 20 ml. of concentrated hydrochloric acid are dropped into the methanol solution with stirring within a period of 30 minutes. The temperature is kept within the range of 35° C.–40° C. After a further two hours, the mixture is cooled to 10° C. and the yellow reaction product filtered by suction. For purification the crude product is dissolved in a little water, whereupon double the amount of methanol is added. The crystallized reaction product is filtered by suction and dried in the air. Its decomposition point is 293° C.–296° C.

This compound also has a vasodepressive activity, which, however, is slightly less prolonged than that of the hydrazone products of Examples 1 and 2 hereinabove.

EXAMPLE 4

*Prepartion of the Compound, Tris-(Pyridylhydrazone) Wherein the Pyridyl Substituents are Attached at the C–2 or C–3 Position Thereof to the Tris-Hydrazone Nucleus*

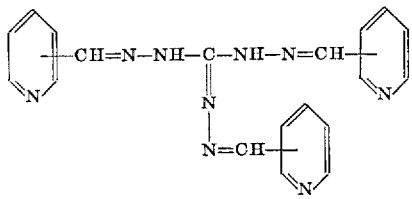

A mixture of 16 grams of pyridine-2-aldehyde and 16 grams of pyridine-3-aldehyde is dissolved in 250 ml. of methanol and heated to 35° C.–40° C. A solution of 14 grams of triaminoguanidine hydrochloride in 80 ml. of water and 10 ml. of concentrated hydrochloric acid and a further 20 ml. of concentrated hydrochloric acid are dropped into the methanol solution, with stirring, within 30 minutes. The temperature is kept within the range of 35° C.–40° C. After a further two hours, 200 ml. of ethanol are added. The solution is cooled to 10° C. and the yellow reaction product is dissolved in a little water, whereupon three times the amount of methanol is added. The yellow crystalline product obtained has a point of decomposition at 290° C.–295° C.

EXAMPLE 5

*Preparation of the Compound, Tris-(Pyridylhydrazone) Where the Pyridyl Substituents are Attached at the C–3 or C–4 Position Thereof to the Tris-Hydrazone Nucleus*

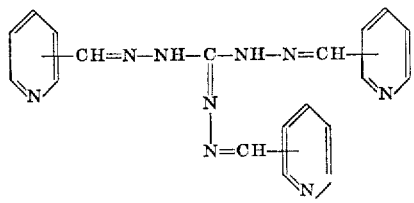

A mixture of 16 grams of pyridine-3-aldehyde and 16 grams of pyridine-4-aldehyde is dissolved in 200 ml. of methanol and heated to 35° C.–40° C. A solution of 14 grams of triaminoguanidine hydrochloride in 80 ml. of water and 10 ml. of concentrated hydrochloric acid and an additional 20 ml. of concentrated hydrochloric acid are dropped into the methanol solution with stirring within a period of 30 minutes. The temperature is maintained within the range of 35° C.–40° C. After a further two hour period 500 ml. of ethanol are added. The solution is cooled to 10° C. and the yellow reaction product is filtered by suction. For purification the crude product is dissolved in a little water, whereupon three times the amount of a mixture of methanol/ethanol is added. Yellow crystals are obtained having a point of decomposition at 278° C.–282° C.

What is claimed:

1. A member selected from the group consisting of a compound of the formula:

$$R-CH=N-NH-C(=N-N=CH-R)-NH-N=CH-R$$

wherein R is pyridyl, and non-toxic acid-addition salts thereof.

2. The compound, tris-(pyridyl-4-hydrazone), of the formula:

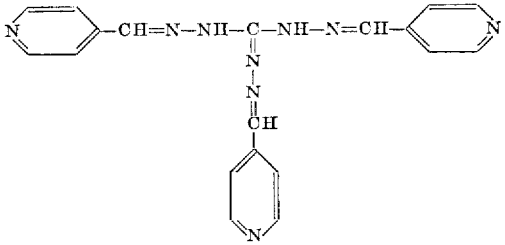

3. The compound, tris-(pyridyl-3-hydrazone), of the formula:

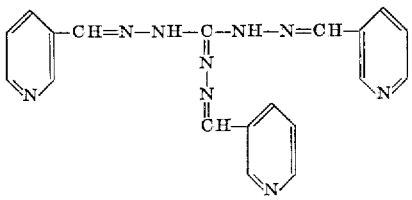

4. The compound, tris-(pyridyl-2-hydrazone), of the formula:

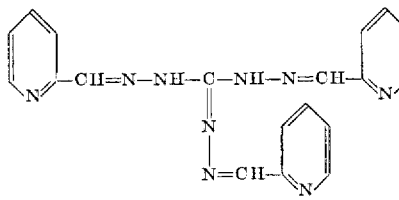

References Cited in the file of this patent

UNITED STATES PATENTS 2,978,456     Birtwell et al. _____ Apr. 4, 1961

OTHER REFERENCES

Scott et al.: J. Am. Chem. Soc., volume 74, page 5802 (1952).

UNITED STATES PATENT OFFICE
CERTIFICATE OF CORRECTION

Patent No. 3,097,203                                                  July 9, 1963

Siegfried Petersen et al.

It is hereby certified that error appears in the above numbered patent requiring correction and that the said Letters Patent should read as corrected below.

Column 3, lines 8 to 13, the formula should appear as shown below instead of as in the patent:

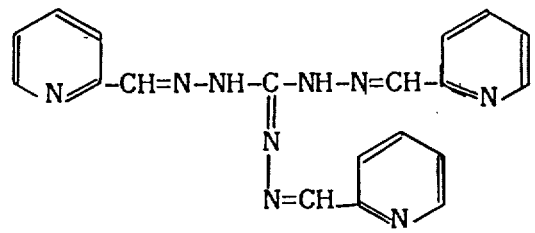

Signed and sealed this 12th day of May 1964.

(SEAL)
Attest:

ERNEST W. SWIDER                                  EDWARD J. BRENNER

Attesting Officer                                Commissioner of Patents